(No Model.)
V. J. KUESS.
METHOD OF ORNAMENTING CHINA, PORCELAIN, &c.
No. 406,745. Patented July 9, 1889.
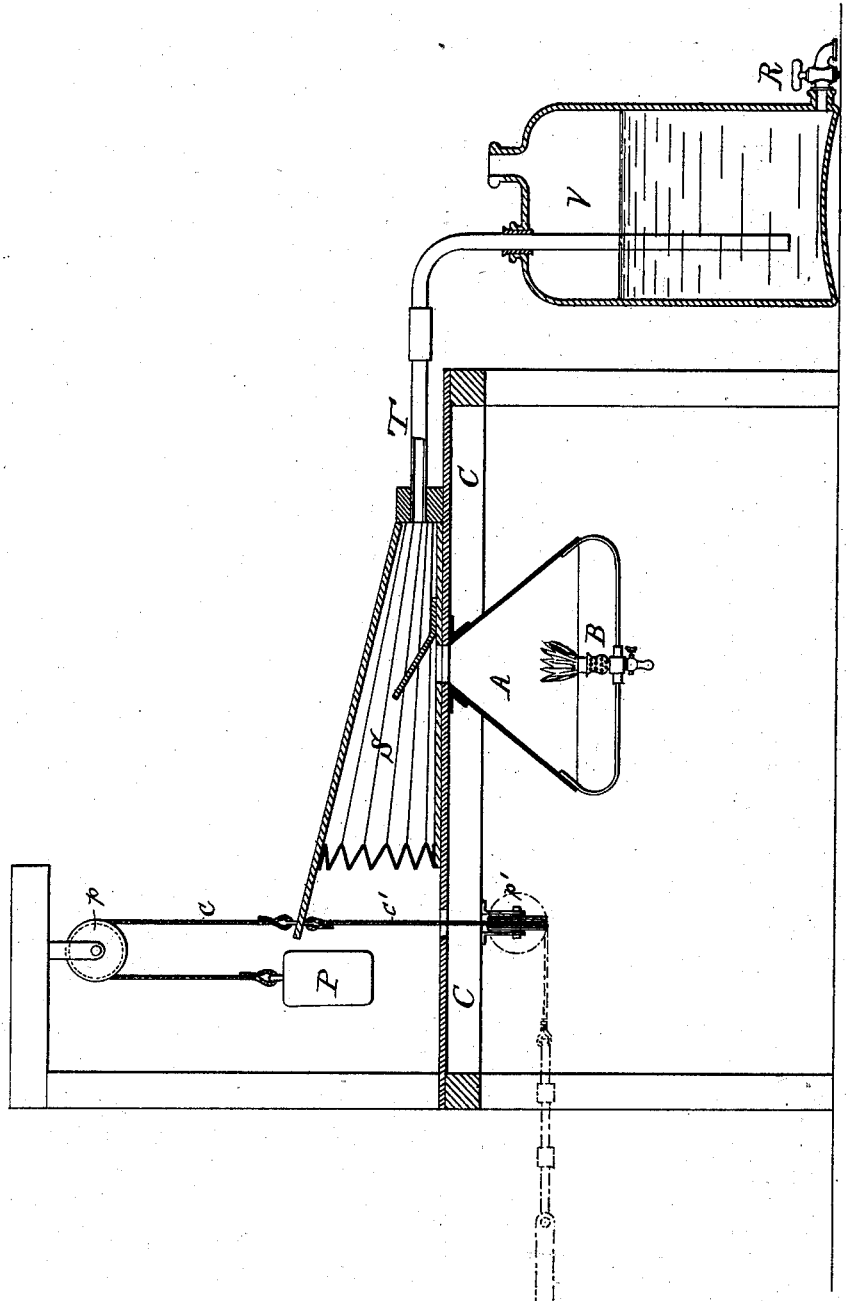
WITNESSES:
E. J. Griswold.
John Revell.
INVENTOR
Victor J. Kuess
BY
Howson and Howson
his ATTORNEYS

UNITED STATES PATENT OFFICE.

VICTOR JOSEPH KUESS, OF PARIS, FRANCE, ASSIGNOR TO F. BAPTEROSSES & COMPANY, OF SAME PLACE.

METHOD OF ORNAMENTING CHINA, PORCELAIN, &c.

SPECIFICATION forming part of Letters Patent No. 406,745, dated July 9, 1889.

Application filed September 11, 1888. Serial No. 285,148. (No specimens.) Patented in England May 23, 1888, No. 7,607.

*To all whom it may concern:*

Be it known that I, VICTOR JOSEPH KUESS, a citizen of the French Republic, residing at 25 Quater Rue Bayen, Paris, in the Republic of France, have invented certain Improvements in Methods of Ornamenting China, Porcelain, &c., (for which I have obtained Letters Patent in Great Britain, May 23, 1888, No. 7,607,) of which the following is a specification.

This invention relates to the ornamentation of china, porcelain, glass, or other articles by means of a preparation or compound employed in the manufacture of the colors, with a bath, by means of which the said colors are vitrified by treating the painted articles in the bath, as hereinafter described, the said treatment acting as a substitute for the elevated temperature of the furnace or muffle heretofore employed.

The preparation or compound used in the manufacture of the colors is composed of two solutions, hereinafter referred to as the A solution and the B solution.

The A solution is prepared as follows: About one hundred parts of white sirupy silicate of potassa are placed in an apparatus provided with a vessel, the lower part of which communicates with a blower or bellows drawing heated air from a cone surrounding a jet or flame of common lighting-gas. The bellows are then set in motion, and when the silicate commences to grow slightly thick or turbid about ten parts of a solution of acetate of lead are added. Care is to be taken to add the acetate gradually and to keep the bellows in action until the whole of the materials in the vessel are thoroughly mixed. The compound or preparation is then placed in a well-stoppered bottle.

The aforesaid solution of acetate of lead is formed by placing about one hundred parts of water in the vessel of the apparatus hereinafter described, and working the bellows until the temperature of the water has been raised to from about 25° to 30° centigrade. About fifteen parts of well-pulverized acetate of lead are then added and the whole is left in the apparatus for about three hours. This solution must be kept in a well-stoppered bottle.

To prepare the B solution, about one hundred parts of water are placed in the specially-constructed apparatus hereinbefore referred to, with about fifty parts of pulverized borax. When the mass commences to become slightly heated, about twenty parts of white glycerine of commerce are added, and the whole allowed to stand for about three hours before placing it in a well-stoppered bottle.

To form the compound or preparation with which the colors are ground, take about six parts of the A solution to about four parts of the B solution. This compound or preparation is mixed with any ordinary vitrifiable colors or pigments in powder, the whole being ground together in the ordinary manner and put up in tubes, for example.

The colors may be used or applied in the same way as ordinary colors; but it is preferable to mix or moisten them with a mixture compound of water and the B solution mixed in equal quantities. The china, porcelain, glass, or other articles painted or decorated with these colors need not be burned or exposed to the temperature of a furnace in order to vitrify the colors, this result being attained by means of a vitrifying-bath, prepared and applied as follows:

A mixture of about twelve parts of water to one of borax is treated in the vessel of the apparatus hereinbefore referred to for about six hours, after which it is placed in another vessel lined with gutta-percha, india-rubber, or marine glue. About fifty parts of hydrochloric acid, ten parts of sulphuric acid, and three parts of hydrofluoric acid are then added to the mixture. In order to vitrify the colors on an article decorated with the improved colors, the article is immersed in the bath for, say, about ten minutes, being washed in water immediately after.

The accompanying drawing illustrates the apparatus hereinbefore referred to, which is constructed with a bellows or blower S, fixed on a suitable stand or support C with a metal top. This bellows is operated by a crank or eccentric E in case a bellows is employed—for example, for forcing air—the said crank or eccentric being connected to the bellows by a cord or cords $c\ c'$, acting in combination with a counter-weight P, the said cord working over pulleys p and p'. The nozzle T of the bellows S is connected by a rubber tube T' with a glass tube T'', descending in the interior of the vessel V, containing the compounds to be treated. Underneath the bellows is a sheet-iron cone A, at the center of which burns a jet of lighting-gas, issuing from a burner B. The bellows S draws in hot air and heated products from the cone A, above the gas-jet, and drives it into the vessel V, which is provided with a suitable cock or valve R for drawing off the liquid when the operation is completed. It is essential to employ a flame produced by the combination of ordinary lighting-gas in the cone A.

By means of this invention a very considerable saving is effected in the preparation and in the application of vitrifiable colors, the loss or waste and the expense of the fuel employed in the usual vitrifying process being entirely obviated.

I claim as my invention—

1. The herein-described method of ornamenting china, porcelain, &c., consisting in painting the articles with vitrifiable colors combined with silicate of potassa, acetate of lead, pulverized borax, and glycerine, and then vitrifying the colors, all substantially as set forth.

2. The method herein described of ornamenting china, porcelain, &c., by painting the articles with vitrifiable colors combined with silicate of potassa, acetate of lead, pulverized borax, and glycerine, and then vitrifying the colors by treatment with a bath composed of a solution of borax, hydrochloric acid, sulphuric acid, and hydrofluoric acid.

In testimony whereof I have signed my name to this specification in the presence of two subscribing witnesses.

VICTOR JOSEPH KUESS.

Witnesses:
LÉON FRANCKEN,
  49 *Rue St. Sebastien.*
R. J. PRESTON.